US009026540B1

(12) United States Patent
Postelnicu et al.

(10) Patent No.: US 9,026,540 B1
(45) Date of Patent: May 5, 2015

(54) SYSTEMS AND METHODS FOR INFORMATION MATCH SCORING

(75) Inventors: Gheorghe Postelnicu, Zurich (CH); Matthew Sharifi, Zurich (CH); Jay Michael Ponte, Mountain View, CA (US); Yaniv Bernstein, Parkville (AU); Khalid Walid Abdel Monem Ashmawy, Bellevue, WA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/363,004

(22) Filed: Jan. 31, 2012

(51) Int. Cl.
*G06F 17/30* (2006.01)

(52) U.S. Cl.
CPC .................. *G06F 17/30289* (2013.01)

(58) Field of Classification Search
CPC ................................ G06F 17/30864
USPC ......................... 707/748–750, 754
See application file for complete search history.

(56) References Cited

U.S. PATENT DOCUMENTS

| | | | |
|---|---|---|---|
| 7,958,136 B1 * | 6/2011 | Curtis et al. ................... | 707/758 |
| 2009/0052784 A1 * | 2/2009 | Covell et al. ................... | 382/209 |
| 2010/0034470 A1 * | 2/2010 | Valencia-Campo et al. .. | 382/218 |
| 2010/0290699 A1 * | 11/2010 | Adam et al. ................... | 382/155 |
| 2011/0019925 A1 * | 1/2011 | Luk ................................ | 382/218 |
| 2011/0106782 A1 * | 5/2011 | Ke et al. ........................ | 707/706 |

OTHER PUBLICATIONS

"Incorporating Global Information in a Folk Song Classification System", Lydia Mutiara Dewi, Department of Communication and Information Sciences, Jul. 2011.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

*Primary Examiner* — Etienne Leroux
*Assistant Examiner* — Cindy Nguyen
(74) *Attorney, Agent, or Firm* — Amin, Turocy & Watson, LLP

(57) ABSTRACT

Systems and methods described herein can assign a confidence score to a match of unstructured descriptive information with structured reference information in a reference database. The systems and methods can take into account the structured nature of the reference information in assigning the score, thereby facilitating increased confidence in the match, and consequently, facilitating improved database organization and content identification.

20 Claims, 8 Drawing Sheets

SYSTEMS AND METHODS FOR INFORMATION MATCH SCORING

TECHNICAL FIELD

This application relates generally to systems and methods for scoring associated with information matching, and more particularly to scoring of matches between unstructured information and structured information.

BACKGROUND

Web sites for sharing of digital media, such as digital music and video files, have become commonplace. The web sites may be accessed to upload music and video files, and to find music and video files to download, listen to or view, as authorized. Often, users of such web sites provide descriptive terms for the music and video files when uploading the files to the web sites. The descriptive terms can facilitate appropriately categorizing and storing of the uploaded files, for example.

There may be no particular restrictions placed on the descriptive terms, and so the descriptive terms can be as varied as the users who think them up. For example, one user might describe an uploaded music or video file in terms of a full title and artist name, while another user might describe an uploaded file in terms of a partial title and a venue where a live performance took place, and so on. Because the descriptive terms can be free-form and may not occur in any particular pattern, the descriptive terms may be considered "unstructured."

In contrast, databases that store media files are typically highly organized and structured, to facilitate efficient storing, searching and retrieval of data. Thus, a database might organize music or video files according to fixed, pre-defined patterns. For example, a particular database might use a particular indexing system or systems with strict rules about how files are to be described. Such a database may be thought of as "structured."

Correctly identifying newly-uploaded files can assist in storing the files within a structured database in such a way that efficiencies in database space utilization, search and data retrieval can be realized. For example, accurately matching unstructured descriptive terms corresponding to a newly-uploaded file to organizing information or predefined field in a structured database can open up possibilities for clustering groups of files which all match the same reference. This can make database navigation and data retrieval more efficient, and can promote more efficient content identification.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

This specification relates generally to systems and methods for scoring of information matching, and more particularly to scoring of matches of unstructured information against a database of structured information. In more detail, the systems and methods can assign a score to structured reference data based on matching of unstructured descriptive information with the structured reference data. The systems and methods can take into account the structured nature of the reference data in assigning the score. This can facilitate increased confidence in the information matching, and consequently, improved database organization and content identification.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
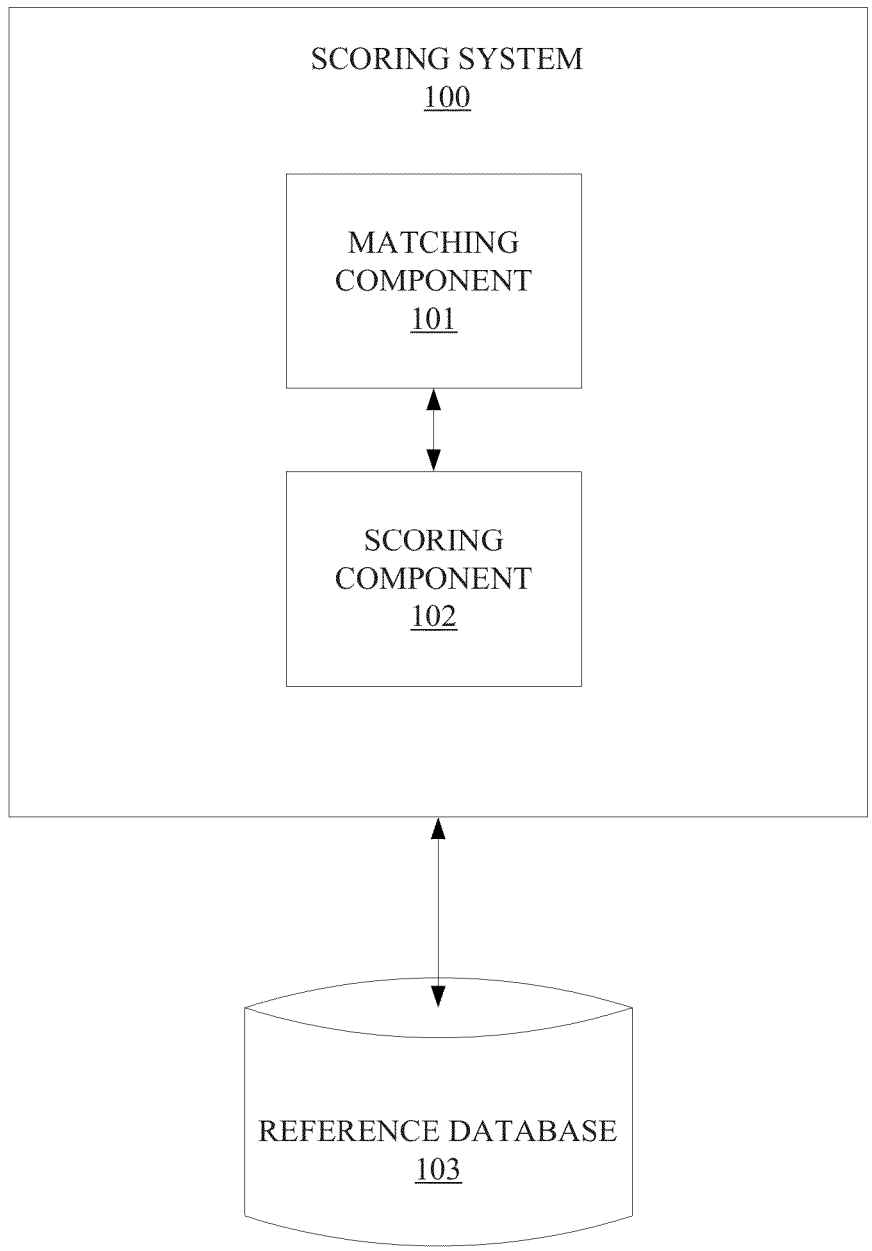
FIG. 1 illustrates a scoring system in accordance with embodiments of this disclosure.

Embodiments of systems for scoring information matching can include a matching component and a scoring component. The matching component can apply unstructured descriptive information, such as free-form descriptive terms associated with a media item, to a structured reference database to select a set of candidate reference items for scoring. The structured reference database, more specifically, can include a plurality of reference items including structured descriptive information, and the set of candidate reference items can be one or more of the reference items including structured descriptive information that matches one or more aspects of the unstructured descriptive information.

The scoring component can assign a score to one or more (e.g., each) of the candidate reference items based on one or more predetermined criteria. The one or more predetermined criteria can include, for example: a degree or extent to which an element of the structured descriptive information is discriminative (as expressed, e.g., by a weighting factor assigned to an element); a length or number of matching terms between the structured descriptive information and the unstructured descriptive information; and an occurrence of a same sequence or ordering of matching terms between the structured descriptive information and the unstructured descriptive information.

The one or more scores produced by the scoring component can be useful in a number of ways. For example, the scores can be used to facilitate identification of candidate reference items that likely represent "false positives" produced by the matching component—that is, that correspond to instances where the matching component selects a candidate reference item from the reference database even though the probability is low that the candidate item is a correct match for the unstructured descriptive information. Thus, the scores can have an advantageous sifting or winnowing effect on the candidate reference items produced by the matching component. More specifically, based on their scores candidate reference items corresponding to false positives can be eliminated from the overall pool of candidate reference items, and operations can go forward with a higher confidence that candidate reference items remaining in the pool are correctly matched with the unstructured descriptive information.

Accordingly, the scoring component can promote efficiencies by creating possibilities for clustering same or similar data files, facilitating improved database navigation, searching and file retrieval, and lowering the burden in subsequent processing of files for content identification. That is, by more accurately categorizing and grouping files based on operations of the scoring component, subsequent examination of files to identify their actual content can be made easier, which among other things can also promote the improved database operations described in the foregoing.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

It should further be understood that the term "component" as used herein, and the variously-labeled component blocks as shown in the drawings, are not intended to suggest that a labeled component is necessarily discrete and separate from another labeled component. The labeled components can be dispersed or intermixed. Additionally, a particular label for a component, rather than indicating any limitation on its capabilities, should be understood as a categorization that generally describes one or a group of structures, capabilities, features or operations associated with the component. However, the structures, capabilities, features or operations may be shared with other components, or may cooperate with other components for combined effects.

Further, as discussed in more detail in the following, the components can be operative within a network, such as the Internet. Network implementations facilitating embodiments of the components are described in more detail further on, with reference to FIGS. 7 and 8.

Referring now to FIG. 1, a scoring system 100 can include a matching component 101 and a scoring component 102 that can communicate with each other. The matching component 101 can apply unstructured descriptive information, such as the free-form, user-supplied descriptive terms described in the preceding, to a reference database 103. The unstructured descriptive information may also be referred to herein as "unstructured metadata." The reference database 103 can include a plurality of reference data items. The reference data items can include digital media files, for example, whose content is already known and which are already organized (e.g., sorted, categorized, identified, classified, grouped, clustered) according to a known, existing system, such as an indexing system. The known information about the reference data items may, thus, be considered structured descriptive information, also referred to herein as "structured metadata."

As noted, the matching component 101 can apply unstructured metadata to the reference database 103 to try to match the unstructured metadata with structured metadata in the reference database 103. The meaning of "match" or "matching" in this context can include various aspects of determining a similarity or correspondence between things. For example, "matching" can refer to comparing elements or aspects of the unstructured metadata with elements or aspects of the structured metadata, and using predefined objective criteria to determine a similarity or correspondence between the compared elements or aspects.

Thus, a "match" need not refer only to things that are exact counterparts or duplicates of each other, although such counterparts are also matches. In other words, the predefined objective criteria referred to in the preceding need not require, in order to determine that given metadata elements or aspects match, that the given metadata elements or aspects be exactly the same in their content, or in their sequence, or that the given metadata elements or aspects exactly meet any other requirements; this could be unduly restrictive and exclude true matches in terms of the actual content of those things that the metadata elements or aspects describe. Instead, the predefined objective criteria can be inclusive in an effort to ensure that true matches are not excluded. Accordingly, the matching component 101 can, based on the applied unstructured metadata, return results that include false positives among true matches.

More specifically, the matching component 101 can return, as a result of matching of the unstructured metadata to the structured metadata, a set of "candidate" reference data items from the reference database 103, where the set of reference data items are candidates in the sense that they will undergo further processing by the scoring component 102 to evaluate the likelihood that they are true matches.

Figure 2:
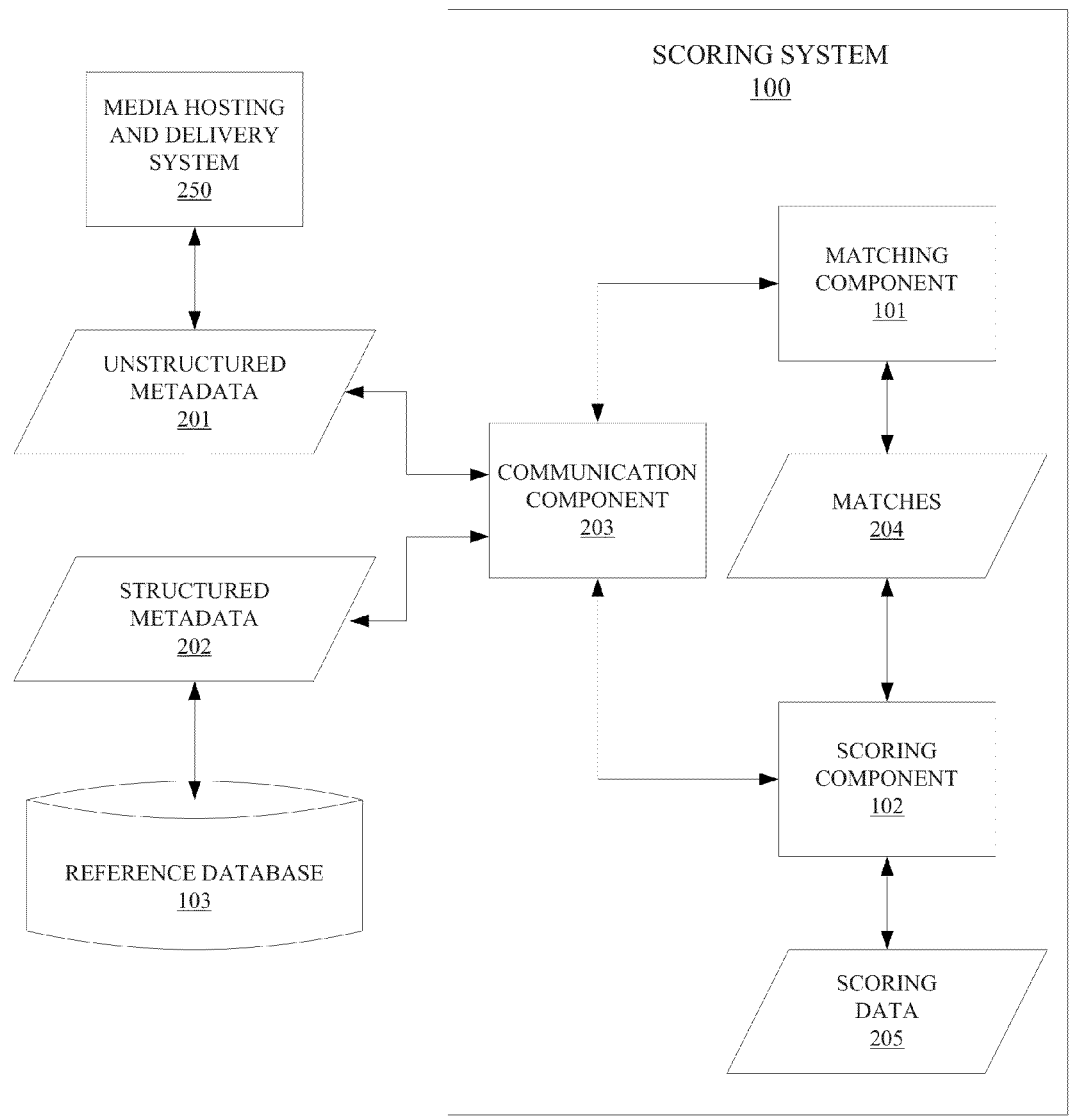
FIG. 2 illustrates interaction of the scoring system with associated data.

Referring to FIG. 2, the scoring system 100 can receive as input unstructured metadata 201. A source of the unstructured metadata 201 can include, for example, a network-based media hosting and delivery system 250, such as a music and/or video sharing web site and associated components (e.g., servers and communication equipment). As previously described, users of such web sites can upload digital music and video files, and when doing so, provide free-form descriptive information, for example in the form of typed text entered via an interface, about the uploaded files. The free-form descriptive information can be stored on a storage device either temporarily or for an indefinite duration.

The scoring system 100 can further include a communication component 203, and receive the unstructured metadata 201 via the communication component 203. The communication component 203 can include components to facilitate handling and transfer of data, such as network components, I/O components, user interfaces, application programming interfaces, data read/write components, and the like. In particular, the communication component 203 can receive the unstructured metadata 201 and perform any needed processing or pre-processing of the unstructured metadata 201, such as formatting, blocking, application of security measures, parsing and the like, and transfer the processed unstructured metadata 201 to the matching component 101.

The communication component 203 can further receive and process structured metadata 202 from the reference database 103. As described previously, the structured metadata can include data organized according to rules of a particular system. For example, for a reference database 103 storing digital music files, the rules could dictate that the files be organized in terms of a particular sequence and content for metadata describing each file stored. The terms could include, for example, a full artist name followed by a full composition title.

The matching component 101 can process the unstructured metadata 201 and the structured metadata 202 to match the unstructured metadata 201 with or against the structured metadata 202 to produce or generate matches 204. The matching can include operations as described previously, e.g., determining one or more aspects of similarity between the unstructured metadata 201 and the structured metadata 202.

For example, the matching component 101 can compare individual terms, tokens or elements, e.g., atomic units as defined by objective standards, of the unstructured metadata 201 with individual terms, tokens or elements, e.g., atomic units, of the structured metadata 202, and make a determination regarding similarity of the compared things. Additionally or alternatively, the matching component 101 can compare sequences of elements of the unstructured metadata 201 with sequences of elements of the structured metadata 202, and make a determination regarding similarity of the compared things. Additionally or alternatively, the matching component 101 can make a determination regarding similarity based on some other objective standard or measure. Additionally or alternatively, the matching component 101 can make a determination regarding similarity between the unstructured metadata 201 and the structured metadata 202 based on any combination of the foregoing, with an output or result as denoted by matches 204.

In embodiments of the scoring system 100, an atomic unit can be a word or a letter, and a sequence can include a text string or a succession of words (e.g., at least two words). A determination regarding similarity based on an objective standard or measure can include the use of weighting factors, statistical information, and functions of the weighting factors and statistical information.

As used in the following, "reference item" can refer to a file stored in the reference database, and any structured information describing the file. The structured information can correspond to structured metadata 202 described in the preceding, and may also be referred to herein as "reference metadata." For example, the structured information can include at least a portion of an entry in an index or catalog of the reference database, and can include such descriptive terms as a file name (e.g. a song or composition or video title) and an associated author name (e.g., an artist or band or creator name). Thus, the file name and author name can be one concrete example of "reference metadata" as used herein. For conciseness, "a reference" may be used herein to more completely mean "reference metadata associated with a reference item."

In view of the foregoing, and referring again to FIG. 2, the matches 204 can include candidate reference metadata associated with candidate reference items. The candidate reference items can correspond, for example, to digital media files of known content stored in the reference database 103. The matches 204 can be passed on for further evaluation by the scoring component 102. The scoring component 102 can process the matches 204, using operations described in more detail further on, to generate or produce or output scoring data 205. The scoring data 205 can include a score assigned to one or more (e.g., each) candidate reference, where the score indicates a degree of confidence (e.g., relative to a perfect score or absolute certainty or knowledge) that the candidate reference is a true match with the unstructured metadata.

To produce the scores, the scoring component 102 can use statistical information, such as Inverse Document Frequency (IDF) information, associated with reference metadata in the reference database 103. The IDF information can be preexisting or can be computed. IDF information can be a measure of how frequently a token or term, such as a word, occurs in a corpus or collection of data. Accordingly, the IDF information can provide a measure of confidence in information searching and matching. For example, the more frequently a term occurs in a corpus of data, as signified by a correspondingly lower IDF value, the lower the confidence may be that a search result or match is a true match, because of the relatively high number of possible matches. On the other hand, the less frequently a term occurs in a corpus of data, as signified by a correspondingly lower IDF value, the higher the confidence may be that a search result or match is a true match, because of the relatively low number of possible matches.

More specifically, the scoring component 102 can use IDF values for N-grams associated with the reference database 103. As is known, "N-gram" can refer to a sequence of contiguous or consecutive terms or tokens or atomic units, however defined, in a corpus of data. Thus, for example: "unigram" or "N-gram of size 1" can refer to a single term or token or atomic unit, e.g., a word; "bigram" or "N-gram of size 2" can refer to a consecutive sequence of two terms or tokens or atomic units, e.g., two consecutive words; and so on. In embodiments of the scoring system 100, the IDF values can be structured in two inverted indices, one for unigrams and one for bigrams. Indexing can be implemented as an inverse mapping from a unigram and/or bigram to a reference in which a corresponding word or words occur, along with corresponding IDF values. Advantageously, such indexing can provide information about the separation of elements in the structured metadata, such as the separation between an artist name and a song name in music metadata.

The discussion turns now to methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Figure 3:
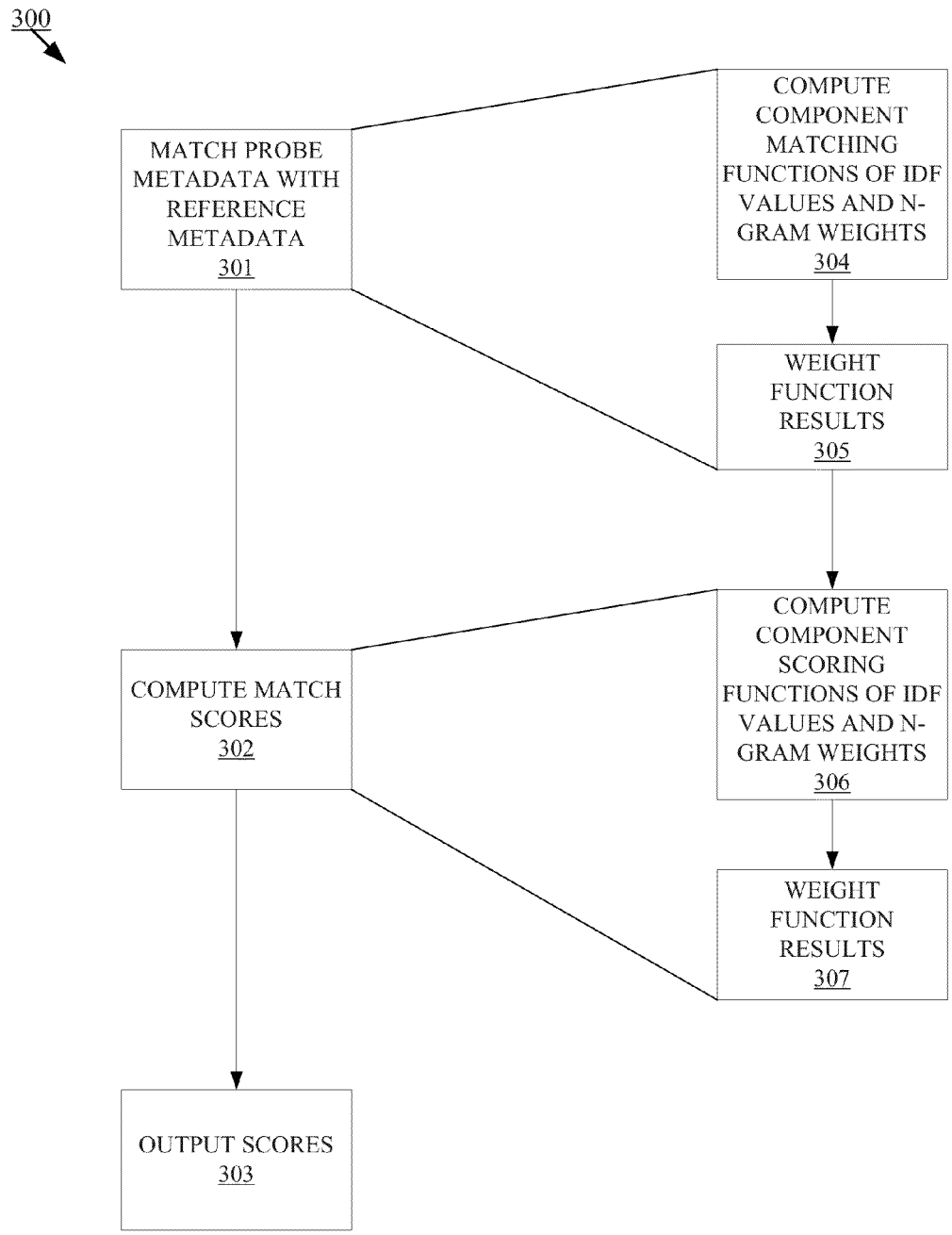
FIGS. 3 and 4 illustrate examples of methodologies in accordance with embodiments of the scoring system.

Referring now to FIG. 3, a methodology 300 according to embodiments of the scoring system 100 is shown. In the following, unstructured metadata 201 may also be referred to as "probe metadata" or simply "Probe," and structured metadata 202 may also be referred to as "reference metadata" or simply "Reference."

At 301, probe metadata can be matched with given reference metadata (e.g., by the matching component) in the reference database 103, and a corresponding value can be assigned to the match. Operations associated with 301 can include, for example, looking up (e.g., by the matching component via the communication component) the IDF values in the two inverted indices, referred to earlier, for unigrams and bigrams in the given reference metadata, and associating each IDF value with its corresponding unigram or bigram. At 302, a score can be computed (e.g., by the scoring component) based on the value assigned to the match, and at 303 corresponding scoring data can be output (e.g., by the scoring component or communication component).

At 304-305, operations associated with 301 are shown in greater detail. At 304, component matching functions of IDF values and N-gram weights can be computed (e.g., by the matching component). At 305, results of the component matching functions can be weighted in a compound matching function (e.g., by the matching component), by weighting values associated with the given reference metadata, to produce a match result.

At 306-307, operations associated with 302 are shown in greater detail. At 306, component scoring functions of IDF values and N-gram weights can be computed (e.g., by the scoring component). At 307, results of the component scoring functions can be weighted in a compound scoring function (e.g., by the scoring component) to produce a score for the given reference metadata.

Figure 4:
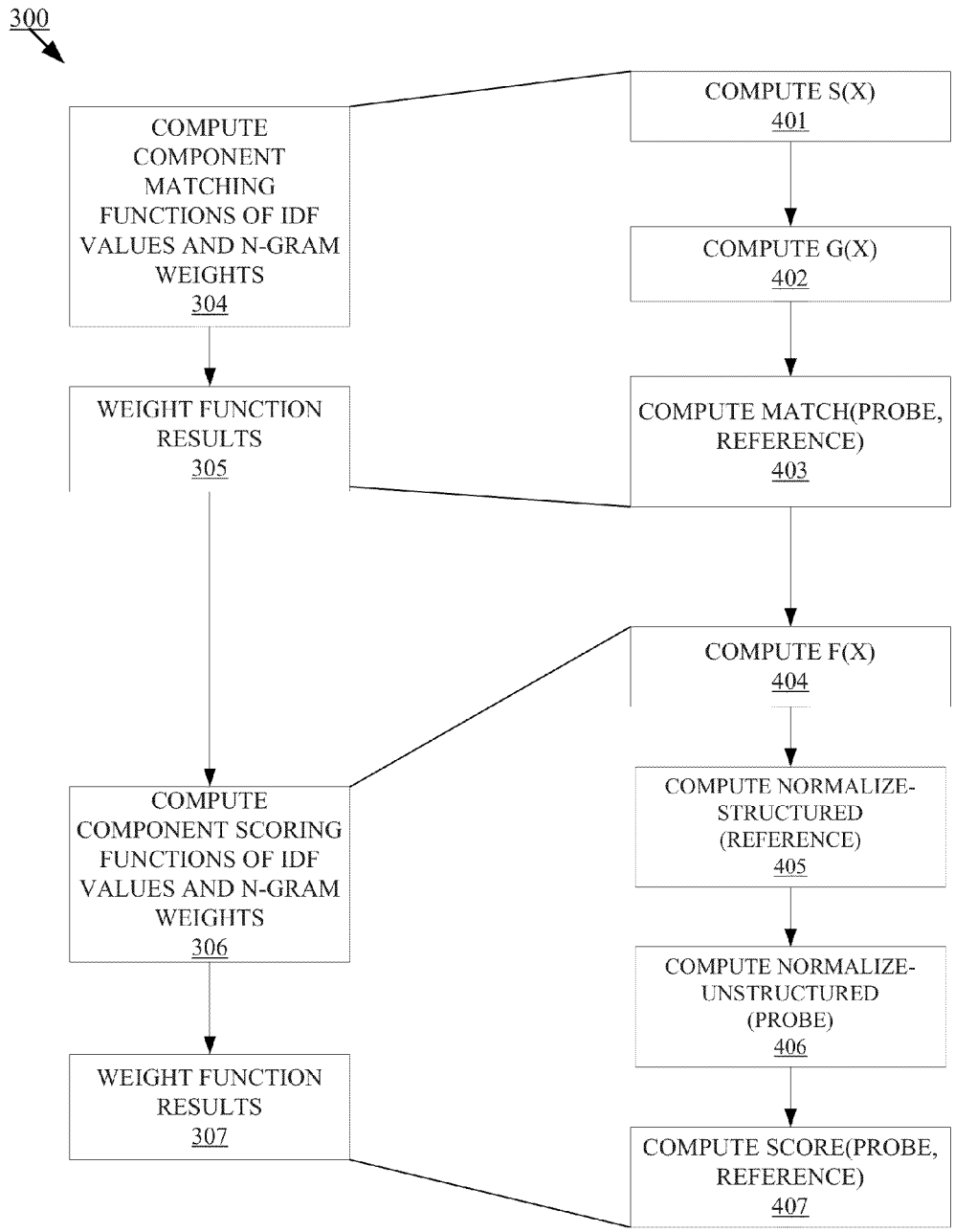

Referring now to FIG. 4, the operations of FIG. 3 are shown in still greater detail. At 401-403, operations associated with 304-305 are illustrated. At 401, the computing of the component matching functions of IDF values and N-gram weights can include computing (e.g., by the matching component) a function S(X), where S(X) can be expressed as:

$S(X)$=a summation of the IDFs of the tokens in $X$(which can be either unigrams [e.g., single words] or bigrams).

At 402, the computing of the component matching functions of IDF values and N-gram weights can further include computing (e.g., by the matching component) a function G(M,N), where G(M,N) can be expressed as:

$G(M,N)=S(A)+\text{BigramWeight}*S(B)$, where A is the set of unigrams (e.g., single words) that match between M and N, and B is the set of bigrams (e.g., two consecutive words) that match between M and N. BigramWeight can be a bigram weight that is a pre-existing value that can be available, for example, from the reference database 103 or one or more associated databases, or that can be computed.

At 403, the computing of the compound matching function of IDF values and N-gram weights can further include computing (e.g., by the matching component) a function Match(Probe,Reference), where Match(Probe,Reference) can be expressed as:

Match(Probe,Reference)=TitleWeight*$G$(Probe,Reference.title)+AuthorWeight*$G$(Probe, Reference.author).

where TitleWeight and AuthorWeight can represent, respectively, a title weight (e.g., a weighting value assigned to reference metadata corresponding to a title associated with the reference item) and an author weight (e.g., a weighting value assigned to reference metadata corresponding to an author associated with the reference item). TitleWeight and AuthorWeight can represent pre-existing values that can be available, for example, from the reference database 103 or one or more associated databases, or that can be computed. Probe can represent probe metadata as described previously, and Reference.title and Reference.author can respectively represent reference metadata corresponding to a title associated with the reference item, and reference metadata corresponding to an author associated with the reference item. TitleWeight and AuthorWeight can correspond, respectively, to Reference.title and Reference.author. A result of 403 can correspond to the match result produced by 305, as described previously.

It is to be appreciated that the weighting as described in the foregoing is only one example of a way in which weighting can be applied. In the particular example under discussion, that is, one involving music metadata, it can be advantageous to "downweight" or reduce a weighting assigned to an author in order to avoid matching all compositions attributed to the author. However, varying types of reference content can call for varying considerations in assigning weights to particular metadata elements, resulting in varying distributions of weighting values. Further, it is to be appreciated that the structured metadata can comprise any number of elements or fields, each of which can be assigned a weight depending on the appropriate considerations, and that the number of elements or fields is not limited to two (e.g., title and author) as in the foregoing example.

At 404-406, operations associated with 306 are illustrated. At 404, the computing of the component scoring functions of IDF values and N-gram weights can include computing (e.g., by the scoring component) a function F(X), where F(X) can be expressed as:

$F(X)=S(U)+\text{BigramWeight}*S(B)$, where BigramWeight is as described earlier, U represents the unigrams included in X and B represents the bigrams included in X.

At 405, the computing of the component scoring functions of IDF values and N-gram weights can further include computing (e.g., by the scoring component), a function NormalizeStructured(Reference), where NormalizeStructured(Reference) can be expressed as:

NormalizeStructured(Reference)=TitleWeight*$F$(Reference.title)+AuthorWeight*$F$(Reference.author), where TitleWeight, AuthorWeight, Reference.title and Reference.author are as described earlier.

At 406, the computing of the component scoring functions of IDF values and N-gram weights can further include computing (e.g., by the scoring component), a function NormalizeUnstructured(Probe), where NormalizeUnstructured (Probe) can be expressed as:

NormalizeUnstructured(Probe)=$F$(Probe).

At 407, operations associated with 307 are illustrated. At 407, the computing of the compound function including the other functions of the IDF values and N-gram weights can include computing (e.g., by the scoring component), a function Score(Probe, Reference), where Score(Probe, Reference) can be expressed as:

Score(Probe,Reference)=Match(Probe,Reference)*
(1+ReferenceWeight)/[NormalizeUnstructured
(Probe)+ReferenceWeight*NormalizeStructured
(Reference)], where ReferenceWeight can represent a weight assigned to Reference (e.g., the reference or structured metadata 202), and can be a pre-existing value that can be available, for example, from the reference database 103 or one or more associated databases, or that can be computed.

The expressions described in the preceding are set forth more concisely in Table 1, below:

TABLE 1

Score(Probe, Reference) = Match(Probe, Reference) * (1 + ReferenceWeight) / [ NormalizeUnstructured(Probe) + ReferenceWeight * NormalizeStructured(Reference)]

TABLE 1-continued where:
Probe = unstructured collection of words (can be assumed, e.g., to potentially contain a title);
Reference = structured collection of data, comprising, e.g. a title field and an artist name field;
Match(Probe, Reference) = TitleWeight * G(Probe, Reference.title) + AuthorWeight * G(Probe, Reference.author);
NormalizeUnstructured(Probe) = F(Probe);
NormalizeStructured(Reference) = TitleWeight * F(Reference.title) + AuthorWeight * F(Reference.author);
F(X) = S(U) + BigramWeight * S(B) - where U represents the unigrams (e.g., single words) included in X and B represents the bigrams made up of consecutive words included in X;
G(M, N) = S(A) + BigramWeight * S(B) - where A represents the set of unigrams that match between M and N and B represents the set of bigrams of consecutive words that match between M and N; and
S(X) = summation of the IDFs of the tokens in X (which can be either unigrams or bigrams).

As an illustration of the operations shown in FIGS. 3 and 4, an example using concrete values is described in the following.

In this example, it is assumed that the unstructured metadata 201 is the text string "boom boom"; the text string may have been generated, for example, by a licensed user uploading a video to a media hosting and delivery system such as system 250. The structured metadata or reference metadata is as follows: author="Black eyed Peas" title="Boom Boom Paw".

It is further assumed that IDF values for unigrams and bigrams in the reference database 103 are as follows:

Unigrams
IDF("black")=0.5
IDF("eyed")=0.6
IDF("peas")=0.6
IDF("boom")=0.8
IDF("paw")=0.8

Bigrams
IDF("black eyed")=0.7
IDF("eyed peas")=0.7
IDF("boom boom")=0.9
IDF("boom paw")=0.9

Given the foregoing example values, and assuming values for BigramWeight, AuthorWeight, TitleWeight and ReferenceWeight are available or can be computed as noted previously, the expressions of Table 1 can be evaluated as follows:

$F$(Reference.author)=(0.5+0.6+0.6)+1.5[BigramWeight]*(0.7+0.7)=3.8

$F$(Reference.title)=(0.8+0.8+0.8)+1.5*(0.9+0.9)=5.10

NormalizeUnstructured(Probe)=(0.8+0.8)+[BigramWeight]*(0.9)=2.95

NormalizeStructured(Reference)=0.3*AuthorWeight*3.8+1.0*TitleWeight*5.10=6.24

Match(Probe,Reference)=1.0*2.95=2.95

Score(Probe,Reference)=((5[ReferenceWeight]+1)*2.95)/(1*2.95+5*6.24)=0.52

As described earlier, the scoring data 205 (represented by the result 0.52 in the preceding example) generated by the scoring systems and methodologies described in the foregoing can be useful, for example, in content identification. Content identification can involve examining a file, e.g., a digital media file, to determine (for example by melody matching, in the case of music media) the file's actual content. As noted earlier, increased efficiency in content identification can facilitate, among other things, improved database navigation, searching and file retrieval.

Figure 5:
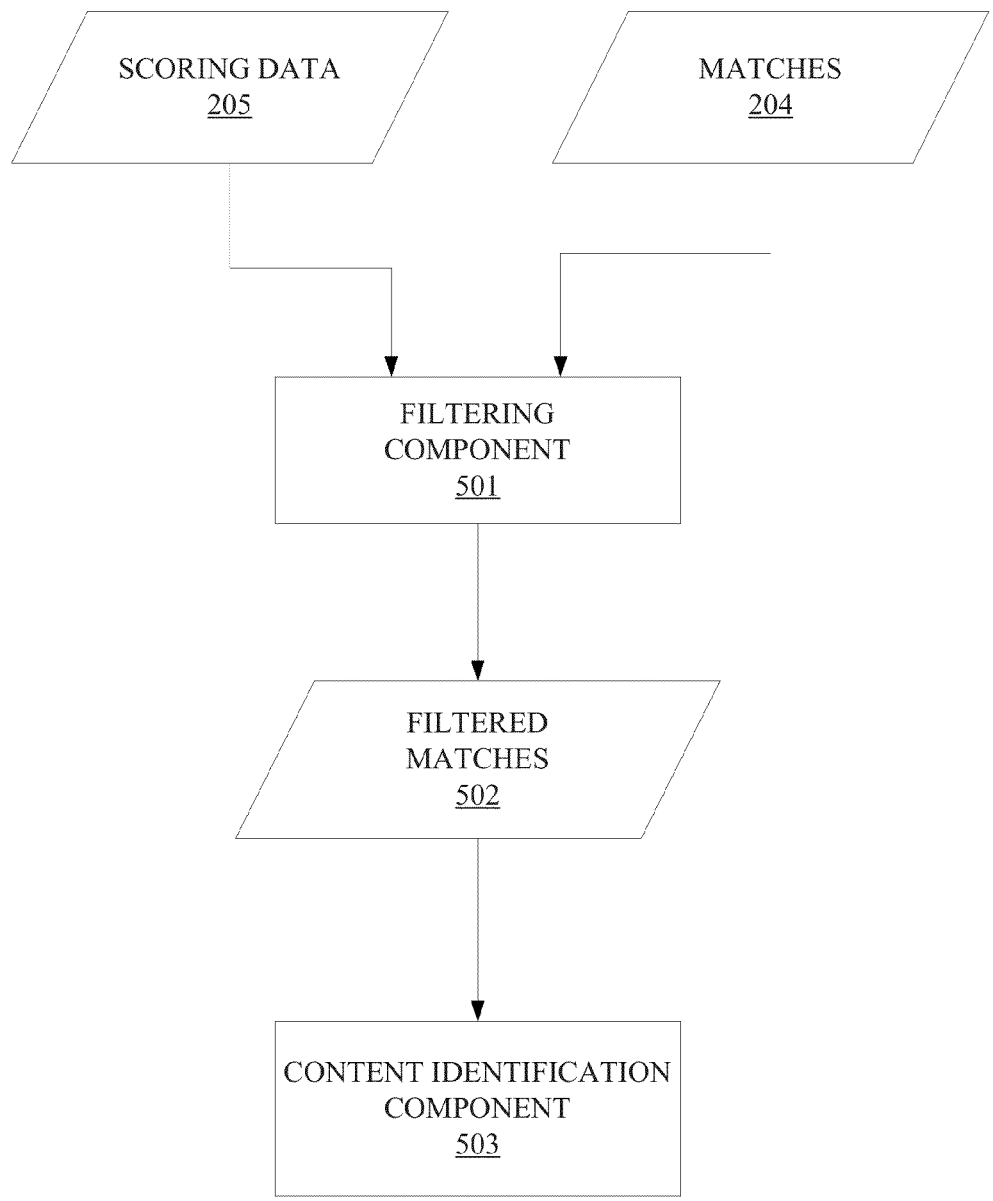
FIG. 5 illustrates additional components associated with the scoring system in accordance with embodiments of this disclosure.

To facilitate content identification, as shown in FIG. 5, the scoring data 205 and the matches 204 can be processed, for example, by a filtering component 501. The filtering component 501 can apply predetermined criteria to the scoring data 205 to thin the field of candidate reference items represented by the matches 204. For example, the predetermined criteria can specify one or more threshold scores that a candidate reference item must meet in order to be considered for further processing. Based on application of the predetermined criteria, a filtered set of matches 502 can be output by the filtering component 501, where the filtered set of matches 502 is smaller than the full set of matches 204. Then, for example, a content identification component 503 can process the filtered set of matches 502, where the filtered set of matches 502 represents a reduced workload, as compared to the full set of matches 204.

Figure 6:
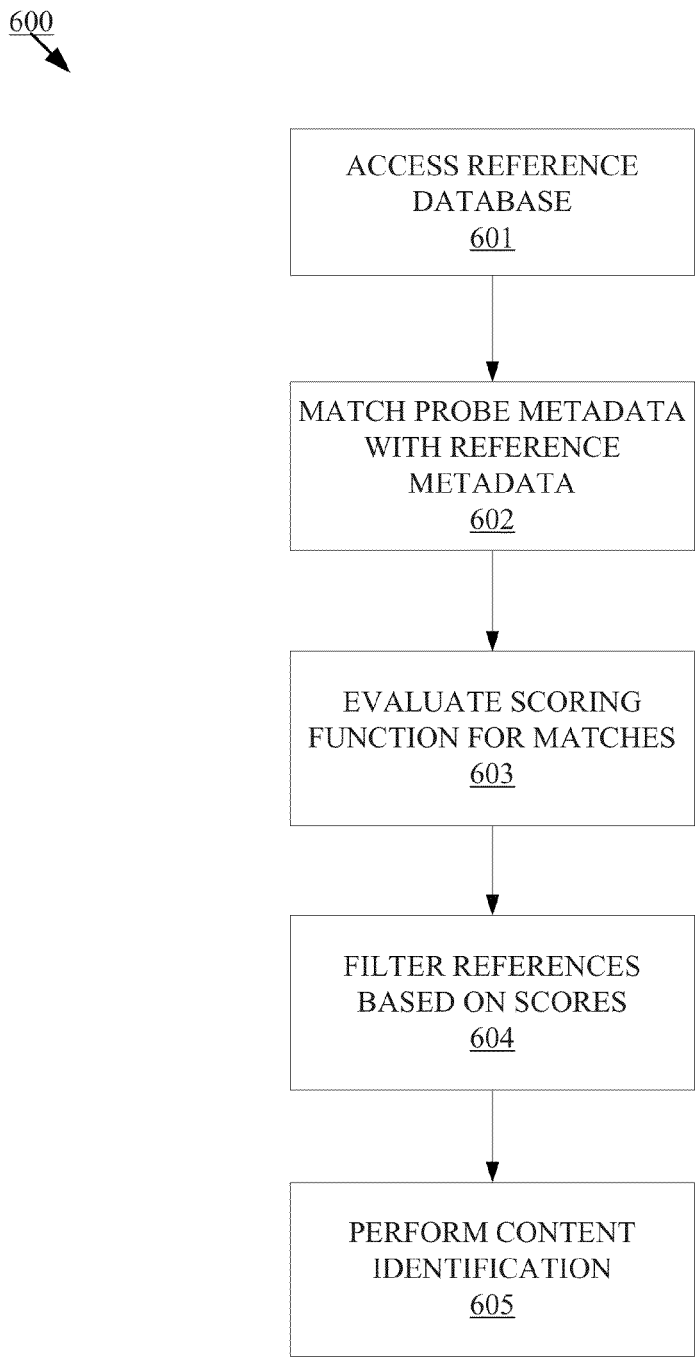
FIG. 6 illustrates another example methodology in accordance with embodiments of the scoring system.

Referring now to FIG. 6, in view of the foregoing another methodology 600 according to embodiments of the scoring system 100 is shown. At 601, a reference database that includes reference metadata describing media items stored in the reference database can be accessed (e.g., by the matching component via the communication component). At 602, probe metadata associated with an uploaded media item can be matched (e.g., by the matching component) with the reference metadata, to obtain a set of one or more candidate references with respective one or more associated weighting values, where the candidate references correspond to one or more of the media items stored in the reference database. At 603, a scoring function, expressed at least partly in terms of the weighting values, can be evaluated (e.g., by the scoring component) for the set of one or more candidate references, to obtain scoring data indicating a probability that a candidate reference is correctly matched with the probe metadata. At 604, results of the scoring function can be filtered (e.g., by a filtering component) to obtain a filtered (e.g., reduced) set of one or more candidate references. At 605, content identification can be performed (e.g., by a content identification component) based the filtered set of one or more candidate references.

Various acts have been described in detail above in connection with respective system diagrams. It is to be appreciated that the detailed description of such acts in the prior figures can be and are intended to be implementable in accordance with the methodologies described herein.

Reference throughout this specification to "embodiments" means that a particular feature, structure, or characteristic described in connection with the embodiments is included in one or more embodiments. Thus, the appearances of the word "embodiments," or "in embodiments," in various places throughout this specification are not necessarily all referring to the same embodiments. Furthermore, the particular features, structures, or characteristics may be combined in any suitable manner in one or more embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 7:
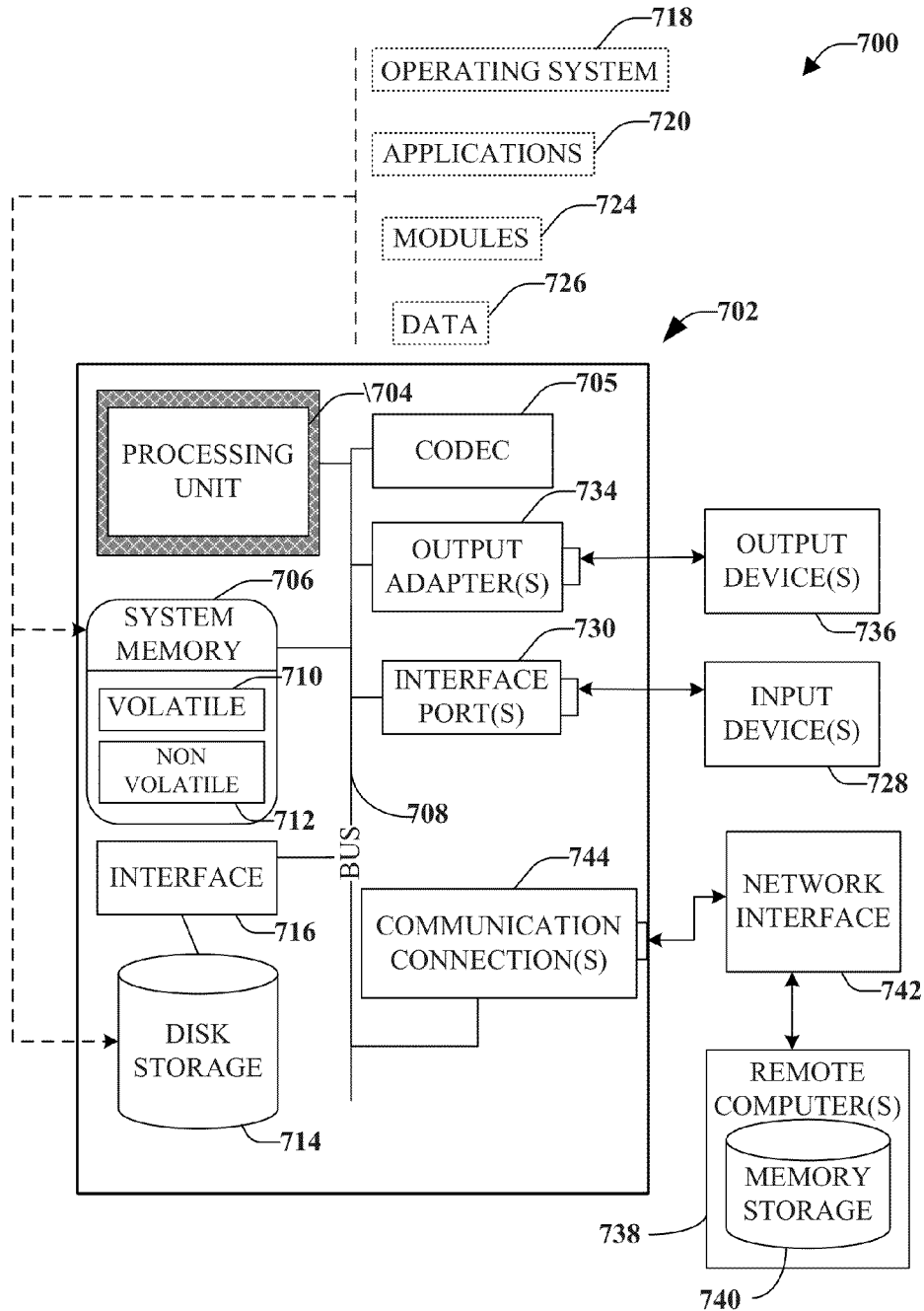
FIG. 7 illustrates an example schematic block diagram for a computing environment in accordance with the subject specification.

With reference to FIG. 7, a suitable environment 700 for implementing various aspects of the claimed subject matter includes a computer 702. The computer 702 includes a processing unit 704, a system memory 706, a codec (coder/decoder) 705, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 706 includes volatile memory 710 and non-volatile memory 712. The basic input/output system (BIOS), containing the basic routines to transfer information between elements within the computer 702, such as during start-up, is stored in non-volatile memory 712. By way of illustration, and not limitation, non-volatile memory 712 can include read only memory (ROM), programmable ROM (PROM), electrically programmable ROM (EPROM), electrically erasable programmable ROM (EEPROM), or flash memory. Volatile memory 710 includes random access memory (RAM), which acts as external cache memory. According to present aspects, the volatile memory may store the write operation retry logic (not shown in FIG. 7) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 702 may also include removable/non-removable, volatile/non-volatile computer storage media. FIG. 7 illustrates, for example, a disk storage 714. Disk storage 714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used, such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer system 702. Applications 720 take advantage of the management of resources by operating system 718 through program modules 724, and program data 726, such as the boot/shutdown transaction table and the like, stored either in system memory 706 or on disk storage 714. It is to be appreciated that the claimed subject matter can be implemented with various operating systems or combinations of operating systems.

A user enters commands or information into the computer 702 through input device(s) 728. Input devices 728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s) 728. Thus, for example, a USB port may be used to provide input to computer 702, and to output information from computer 702 to an output device 736. Output adapter 734 is provided to illustrate that there are some output devices 736 like monitors, speakers, and printers, among other output devices 736, which require special adapters. The output adapters 734 include, by way of illustration and not limitation, video and sound cards that provide a means of connection between the output device 736 and the system bus 708. It should be noted that other devices and/or systems of devices provide both input and output capabilities such as remote computer(s) 738.

Computer 702 can operate in a networked environment using logical connections to one or more remote computers, such as remote computer(s) 738. The remote computer(s) 738 can be a personal computer, a server, a router, a network PC, a workstation, a microprocessor based appliance, a peer device, a smart phone, a tablet, or other network node, and typically includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 744 refers to the hardware/software employed to connect the network interface 742 to the bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

Figure 8:
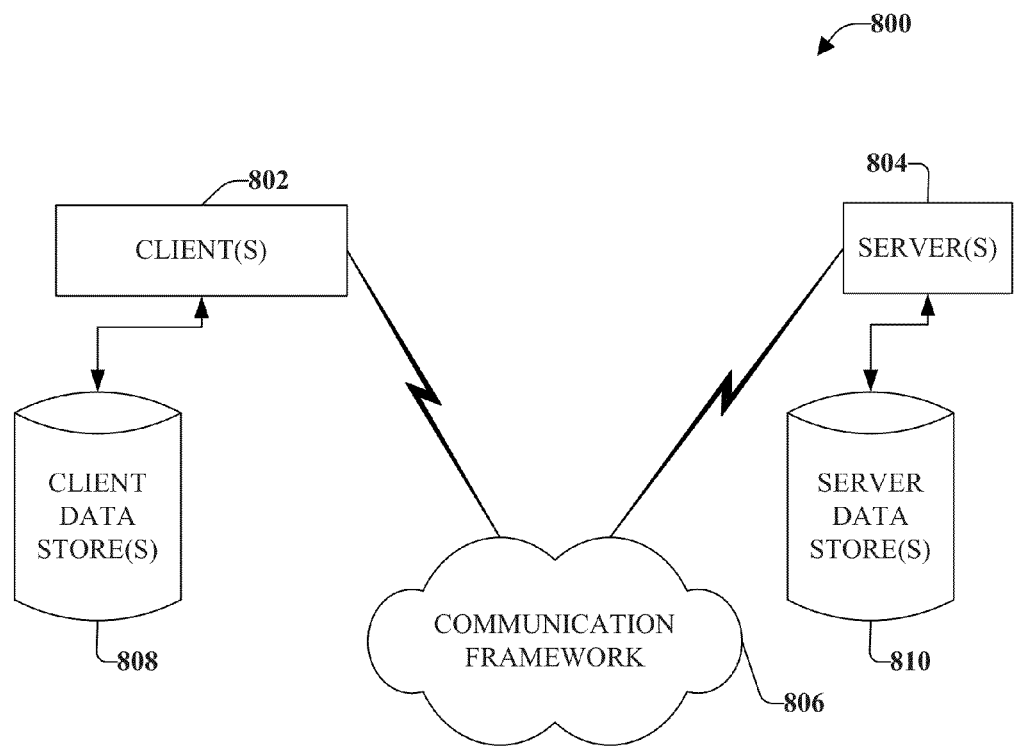
FIG. 8 illustrates an example block diagram of a computer operable to execute the disclosed embodiments.

Referring now to FIG. 8, there is illustrated a schematic block diagram of a computing environment 800 in accordance with the subject specification. The system 800 includes one or more client(s) 802, which can include an application or a system that accesses a service on the server 804. The client(s) 802 can be hardware and/or software (e.g., threads, processes, computing devices). The client(s) 802 can house cookie(s), metadata and/or associated contextual information by employing the specification, for example.

The system 800 also includes one or more server(s) 804. The server(s) 804 can also be hardware or hardware in combination with software (e.g., threads, processes, computing devices). The servers 804 can house threads to perform, for example, interest point detection, distorting, merging, pruning, mixing, fingerprint generation, matching score generation, or fingerprint comparisons in accordance with the subject disclosure. One possible communication between a client 802 and a server 804 can be in the form of a data packet adapted to be transmitted between two or more computer processes where the data packet contains, for example, an audio sample. The data packet can include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 88 that can be employed to store information local to the servers 804.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising
a processor; and
a memory communicatively coupled to the processor, the memory having stored therein computer-executable instructions, comprising:
a communication component that receives unstructured metadata included in a probe media item, wherein the unstructured metadata comprises a free-form text description of the media item;
a matching component that matches the unstructured metadata to structured metadata comprising a structured text description of a reference media item in a reference database based upon a matching function value; and
a scoring component that determines a confidence score for the reference media item based upon a scoring function comprised of a first product of the matching function value and a first sum of one and a reference weight, the first product divided by a second sum of a normalized unstructured function value for the probe media item and a second product of the reference weight and a normalized structured function value of the reference media item.

2. The system of claim 1, wherein the matching function value is based upon a third product of a title weight and a title match scoring function value, the third product added to a fourth product of an author weight and an author match scoring function value.

3. The system of claim 2, wherein the title match scoring function value is based upon a first count of a quantity of unigrams in a probe media item title parameter of the unstructured metadata that match unigrams in a reference media item title parameter of the structured metadata, the first count added to a fifth product of a bigram weight and a second count of a quantity bigrams in the probe media item title parameter that match bigrams in the reference media item title parameter.

4. The system of claim 2, wherein the author match scoring function value is based upon a first count of a quantity of unigrams in a probe media item author parameter of the unstructured metadata that match unigrams in a reference media item author parameter of the structured metadata, the first count added to a fifth product of a bigram weight and a second count of a quantity bigrams in the probe media item author parameter that match bigrams in the reference media item author parameter.

5. The system of claim 1, wherein the normalized unstructured function value is based upon a first count of a quantity of unigrams in the unstructured metadata, the first count added to a fifth product of a bigram weight and a second count of a quantity of bigrams in the unstructured metadata.

6. The system of claim 1, wherein the normalized structured function value is based upon a third product of a title weight and a title scoring function value, the third product added to a fourth product of an author weight and an author scoring function value.

7. The system of claim 6, wherein the title scoring function value is based upon a first count of a quantity of unigrams in a probe media item title parameter of the unstructured metadata, the first count added to a fifth product of a bigram weight and a second count of a quantity of bigrams in the probe media item title parameter.

8. The system of claim 6, wherein the author scoring function value is based upon a first count of a quantity of unigrams in a probe media item author parameter of the unstructured metadata, the first count added to a fifth product of a bigram weight and a second count of a quantity of bigrams in the probe media item author parameter.

9. The system of claim 1, further comprising a filtering component that selectively filters the reference media item based upon the confidence score.

10. A method, comprising
matching, by a system including a processor, unstructured metadata included in an uploaded media and representing a free-form text description associated with the uploaded media with structured metadata representing a structured text description of a candidate media in a reference database based upon a matching function value; and
determining, by the system, a confidence score for the candidate media based upon a scoring function comprised of a first product of the matching function value and a first sum of one and a candidate weight, the first product divided by a second sum of a normalized unstructured function value for the probe media item and a second product of the candidate weight and a normalized structured function value of the candidate media.

11. The method of claim 10, wherein the matching function value is based upon a third product of a title weight and a title match scoring function value, the third product added to a fourth product of an author weight and an author match scoring function value.

12. The method of claim 11, wherein the title match scoring function value is based upon a first count of a quantity of unigrams in an uploaded media title parameter of the unstructured metadata that match unigrams in a candidate media title parameter of the structured metadata, the first count added to a fifth product of a bigram weight and a second count of a quantity bigrams in the uploaded media author parameter that match bigrams in the candidate media title parameter.

13. The method of claim 11, wherein the author match scoring function value is based upon a first count of a quantity of unigrams in an uploaded media author parameter of the unstructured metadata that match unigrams in a candidate media author parameter of the structured metadata, the first count added to a fifth product of a bigram weight and a second count of a quantity bigrams in the uploaded media author parameter that match bigrams in the candidate media author parameter.

14. The method of claim 10, wherein the normalized unstructured function value is based upon a first count of a quantity of unigrams in the unstructured metadata, the first count added to a fifth product of a bigram weight and a second count of a quantity of bigrams in the unstructured metadata.

15. The method of claim 10, wherein the normalized structured function value is based upon a third product of a title weight and a title scoring function value, the third product added to a fourth product of an author weight and an author scoring function value.

16. The method of claim 15, wherein the title scoring function value is based upon a first count of a quantity of unigrams in an uploaded media title parameter of the unstructured metadata, the first count added to a fifth product of a bigram weight and a second count of a quantity of bigrams in the uploaded media title parameter.

17. The method of claim 15, wherein the author scoring function value is based upon a first count of a quantity of unigrams in an uploaded media author parameter of the unstructured metadata, the first count added to a fifth product of a bigram weight and a second count of a quantity of bigrams in the uploaded media author parameter.

18. The method of claim 10, further comprising selectively filtering, by the system, the candidate media based upon the confidence score.

19. A non-transitory computer-readable medium having instructions stored thereon that, in response to execution, cause a system including a processor to perform operations comprising:
matching probe metadata included in an uploaded media item with reference metadata representing a structured text description of a candidate media item in a reference database based upon a matching function value, wherein the probe metadata includes a free-form text description of the uploaded media item;
determining a confidence score for the candidate media item based upon a scoring function comprised of a first product of the matching function value and a first sum of one and a candidate weight, the first product divided by a second sum of a normalized unstructured function value for the probe media item and a second product of the candidate weight and a normalized structured function value of the candidate media.

20. The non-transitory computer-readable medium of claim 19, the operations further comprising selectively filtering the candidate media item based upon the confidence score.

* * * * *